US010042662B1

(12) United States Patent
Marquardt et al.

(10) Patent No.: US 10,042,662 B1
(45) Date of Patent: Aug. 7, 2018

(54) NETWORK FUNCTION VIRTUALIZATION (NFV) PARAMETER TRUST IN DATA COMMUNICATION SYSTEMS

(71) Applicant: Sprint Communications Company L.P., Overland Park, KS (US)

(72) Inventors: Ronald R. Marquardt, Woodinville, WA (US); Lyle Walter Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 77 days.

(21) Appl. No.: 14/680,406

(22) Filed: Apr. 7, 2015

(51) Int. Cl.
G06F 9/455 (2018.01)
H04L 29/06 (2006.01)

(52) U.S. Cl.
CPC ........ G06F 9/45558 (2013.01); H04L 63/123 (2013.01); G06F 2009/45595 (2013.01)

(58) Field of Classification Search
CPC ............... G06F 9/50; G06F 9/45558; G06F 2009/45595; H04L 63/00; H04L 63/123
USPC .......................................................... 718/1
See application file for complete search history.

(56) References Cited

U.S. PATENT DOCUMENTS

| 7,889,734 | B1 | 2/2011 | Hendel et al. |
| 7,987,464 | B2 | 7/2011 | Day et al. |
| 8,195,175 | B2* | 6/2012 | Govindan ............... H04L 47/10 455/410 |
| 8,195,819 | B1* | 6/2012 | Delker .................... G06F 21/41 709/229 |
| 8,250,572 | B2 | 8/2012 | Dahlstedt |
| 8,494,576 | B1 | 7/2013 | Bye et al. |
| 8,504,097 | B1 | 8/2013 | Cope et al. |
| 8,649,770 | B1 | 2/2014 | Cope et al. |
| 8,667,607 | B2 | 3/2014 | Paczkowski et al. |
| 8,752,160 | B1 | 6/2014 | Delker et al. |
| 8,769,706 | B2* | 7/2014 | Deng .................. H04L 63/1483 713/182 |
| 8,819,447 | B2 | 8/2014 | Shipley et al. |

(Continued)

FOREIGN PATENT DOCUMENTS

WO 2013122597 8/2013

OTHER PUBLICATIONS

European Telecommunications Standards Institute ETSI "Network Functions Virtualisation (NFV); NFV Security; Security and Trust Guidance", ETSI GS NFV-SEC 003 V1.1.1 (Dec. 2014). pp. 1-57.*

*Primary Examiner* — Benjamin Wu
*Assistant Examiner* — Willy W Huaracha

(57) ABSTRACT

A data communication system verifies Network Function Virtualization (NFV) parameters. The data system transfers communications for devices by executing hypervisors to generate an NFV processing environment with multiple NFV time slices. The system executes virtual Network Elements (vNEs) during the NFV time slices. The system associates the communication devices with the NFV time slices based on the execution of the vNEs during the time slices. The system yields NFV data indicating an actual NFV time slice used to transfer data communications for an individual communication device and a trusted NFV time slice for that communication device. The system transfers alert data for the communication device if the actual NFV time slice does not correspond to the trusted NFV time slice.

7 Claims, 7 Drawing Sheets

(56) References Cited

U.S. PATENT DOCUMENTS

| | | | |
|---|---|---|---|
| 2009/0328193 A1* | 12/2009 | Moore | G06F 21/53 |
| | | | 726/15 |
| 2010/0311401 A1 | 12/2010 | Oh et al. | |
| 2013/0345530 A1 | 12/2013 | McRoberts et al. | |
| 2014/0047548 A1 | 2/2014 | Bye et al. | |
| 2014/0201374 A1* | 7/2014 | Ashwood-Smith | H04L 49/70 |
| | | | 709/226 |
| 2014/0229945 A1 | 8/2014 | Barkai et al. | |
| 2017/0214694 A1* | 7/2017 | Yan | H04L 63/101 |

* cited by examiner

US 10,042,662 B1

NETWORK FUNCTION VIRTUALIZATION (NFV) PARAMETER TRUST IN DATA COMMUNICATION SYSTEMS

TECHNICAL BACKGROUND

Data communication networks operate computer systems to provide various data services. The data services include internet access, media conferencing, file access, messaging, content delivery, and the like. The computer systems process virtual network elements to forward data packets for the data services. The different data services are associated with the virtual network elements that provide their services. The different data services are also associated with Access Point Names (APNs), Virtual Private Networks (VPNs), network addresses, user names, and other service metadata.

The computer systems implement Network Function Virtualization (NFV) data processing environments using hypervisor software and context switching circuitry. The NFV environment distributes the execution of the virtual network elements across various processing time cycles. The processing time cycles each have a repeating set of dedicated processing times. The context switching provides the executing virtual network element with its own context data while usually hiding the context data of the other processing time cycles. Some network elements execute during mutually exclusive processing time cycles with context switching to maintain physical isolation. The virtual network elements are installed, executed, and transferred as new data services and networking technologies are implemented. A complex and dynamic virtual network element environment is the result.

Unfortunately, the NFV systems do not provide efficient and effective systems and methods to validate the trust of NFV parameters for individual communication devices based on the actual execution of the virtual network elements.

TECHNICAL OVERVIEW

A data communication system verifies Network Function Virtualization (NFV) parameters. The data system transfers communications for devices by executing hypervisors to generate an NFV processing environment with multiple NFV time slices. The system executes virtual Network Elements (vNEs) during the NFV time slices. The system associates the communication devices with the NFV time slices based on the execution of the vNEs during the time slices. The system yields NFV data indicating an actual NFV time slice used to transfer data communications for an individual communication device and a trusted NFV time slice for that communication device. The system transfers alert data for the communication device if the actual NFV time slice does not correspond to the trusted NFV time slice.

DETAILED DESCRIPTION

Figure 1:
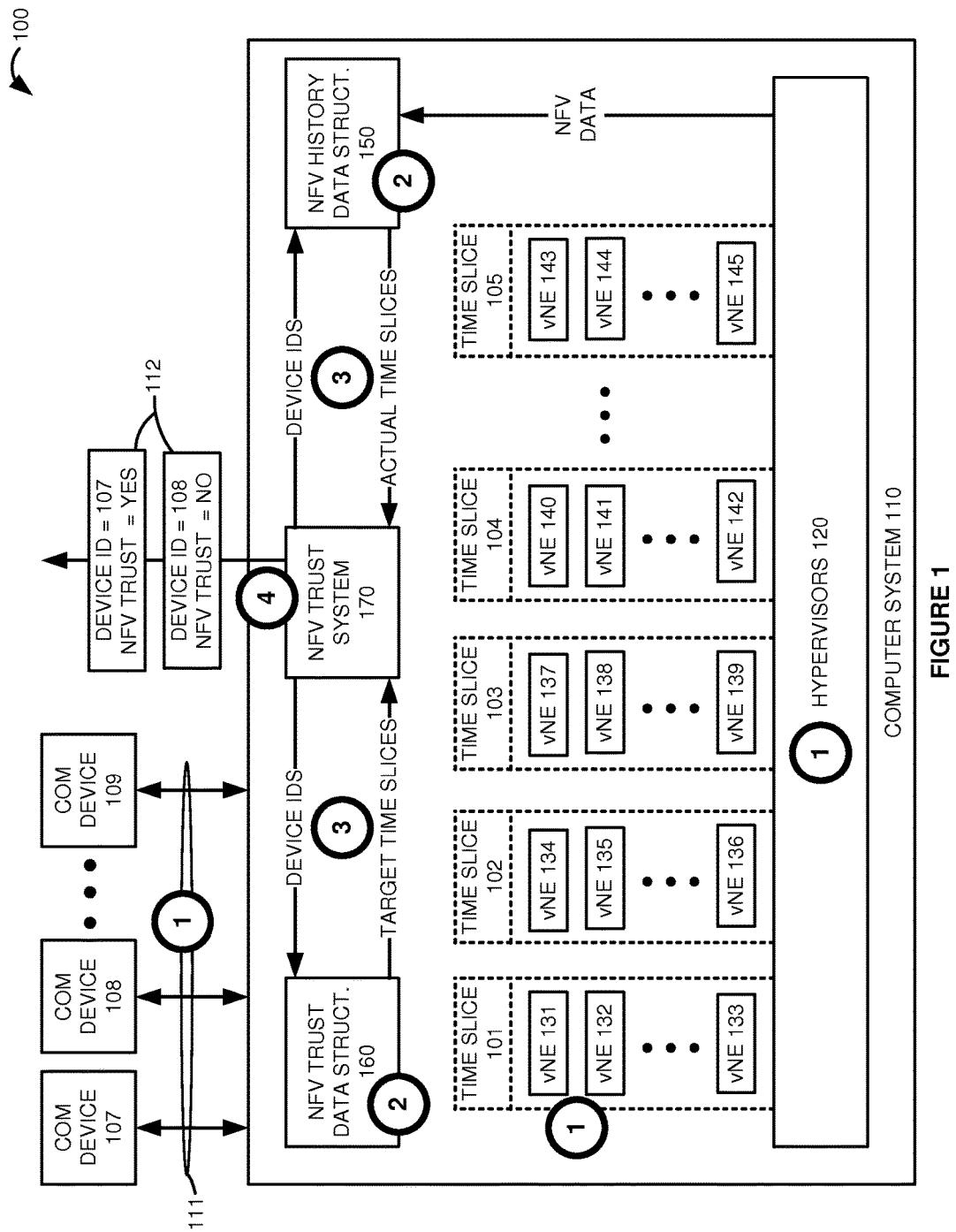
FIGS. 1-3 illustrate a data communication system to validate Network Function Virtualization (NFV) parameters for communication devices.
Figure 2:
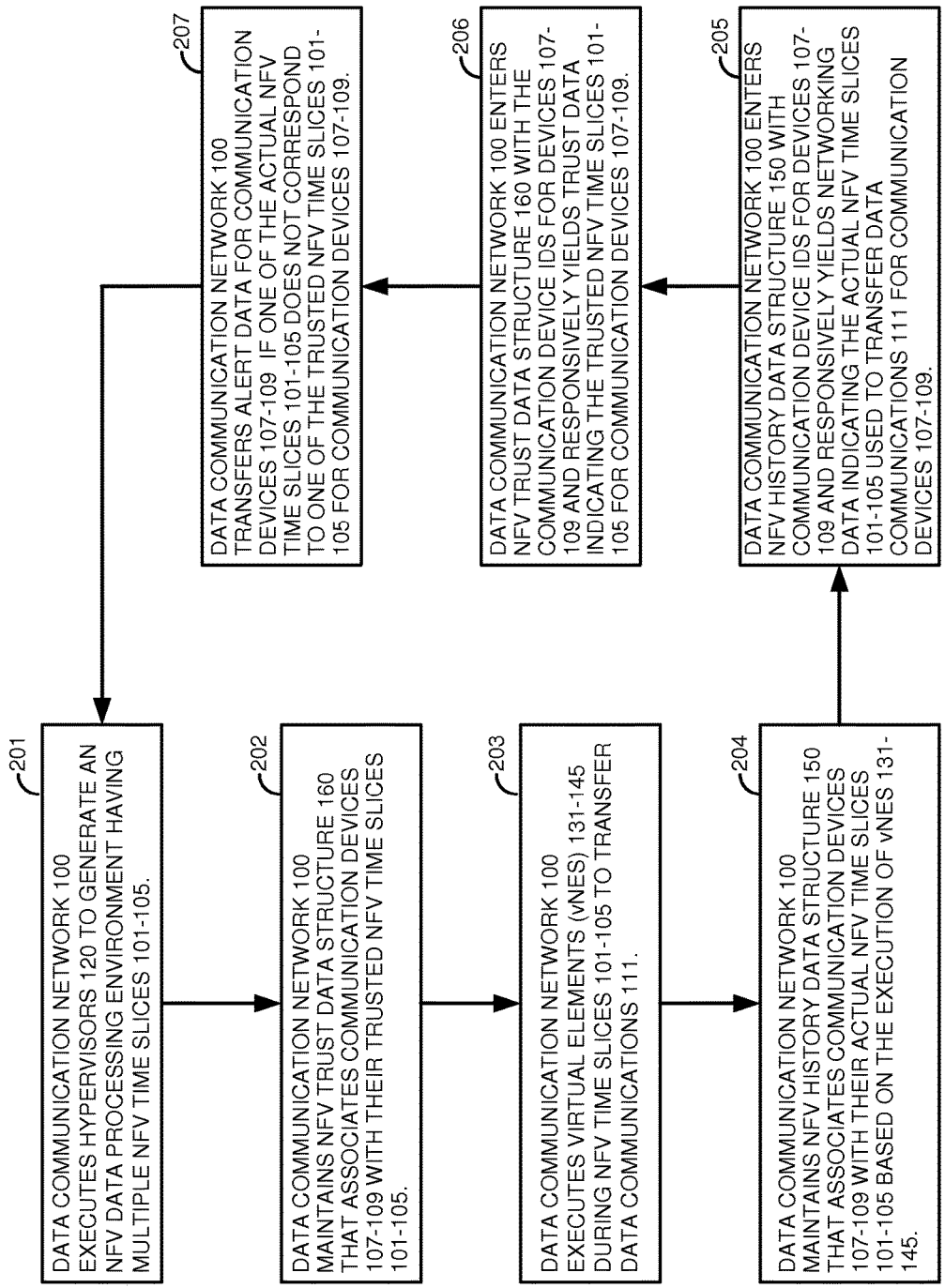
Figure 3:
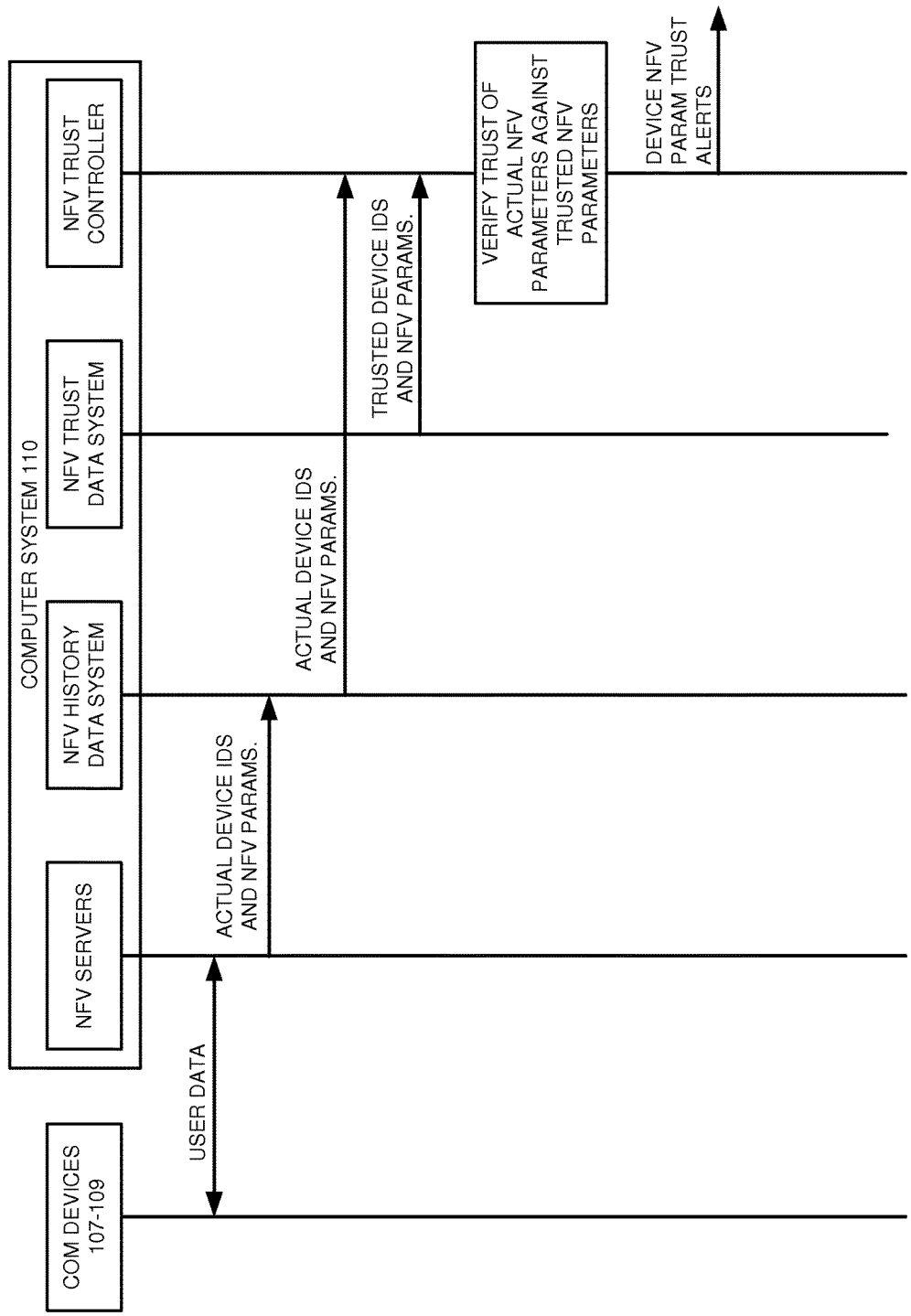

FIGS. 1-3 illustrate data communication system 100 to validate Network Function Virtualization (NFV) parameters for communication devices 107-109. Data communication system 100 includes computer system 110 that exchanges data communications 111 with communication devices 107-109. Data communications 111 comprise user data carried within Internet Protocol (IP) packets, Ethernet frames, optical wavelengths, or some other data transport technology—including combinations thereof. Communication devices 107-109 comprise computers, servers, intelligent machines, gateways, and the like.

Computer system 110 applies NFV functions to data communications 111, such as routing, payload inspection, transcoding, or some other data communication process—including combinations thereof. Computer system 110 also transfers NFV data 112 that identifies individual communication devices 107-109 and the current trust status of their associated NFV parameters. Computer system 110 comprises computer circuitry, data memory, software, and communication interfaces. Computer system 110 may be located at a single physical site or be distributed across numerous physical sites. For example, computer system 110 might comprise a single server blade or comprise several geographically distributed server systems that interconnect over an array of IP networks.

Computer system 110 executes hypervisors 120 to generate an NFV data processing environment. The NFV data processing environment is divided in the time domain, and the resulting time slots are allocated to various software modules with context switching in between modules. The allocation of the NFV time slots is typically scheduled and cyclical, but processing times may be allocated in an on-demand, best effort, or some other manner. The allocated time slots for a specific network system or service comprise the NFV time slice(s) for that system/service. A particular data system/service will often use a dedicated NFV time slice for its operations. In some examples, different networks or sub-networks may share an NFV time slice by prior arrangement. Thus, computer system 110 hosts numerous different data systems and services and manages the NFV time slices used by these systems and services.

In a first operation, computer system 110 and hypervisors 120 generate NFV time slices 101-105 for the execution of vNEs 131-145. Computer system 110 executes vNEs 131-145 during time slices 101-105 to exchange data communications 111 between communication devices 107-109. vNEs 131-145 process data communications 111 to provide various data services like internet access, media conferencing/streaming, messaging, file transfers, machine control, and the like. Note that the number of communication devices, NFV time slices, and vNEs shown on FIG. 1 is restricted for clarity.

In a second operation, computer system 110 maintains NFV history data structure 150 that individually associates communication devices 107-109 with actual NFV time slices 101-105 (and possibly other NFV parameters) based the actual execution of vNEs 131-145 by hypervisors 120 during time slices 101-105. For example, hypervisors 120 may indicate that vNEs 137-139 were executed during NFV time slice 103. Other NFV parameters are typically associated with communication devices 107-109 in history data structure 150 as well, such as server Identifiers (IDs), memory IDs, vNE IDs, hypervisor IDs, APNs, VPN IDs, network addresses, user names, or some other communication data—including combinations thereof.

In the second operation, computer system 110 also maintains NFV trust data structure 160 that individually associates communication devices 107-109 with trusted NFV time slices and typically other trusted NFV parameters. The trusted NFV time slices and other parameters are based on known network design and control data. For example, communication device 107 may be designated to use only trusted vNEs 134-136 during trusted NFV time slice 102. In another example, communication device 109 may be designated to use only trusted vNEs 142-144 during trusted time slice 105. In yet another example, communication device 108 may be designated to use only trusted NFV time slice 101, server 110, memory 110, vNEs 131-133, hypervisor 120, APN "NETX", VPN "100X", and user name "johndoe@wireless.net."

In a third operation in computer system 110, NFV trust system 170 enters NFV history data structure 150 with device IDs for communication devices 107-109 to yield actual NFV time slices 101-105 used to service communication devices 107-109. Other actual NFV parameters (server ID, memory ID, vNE IDs, APNs) may be yielded in a like manner. Likewise, NFV trust system 170 enters NFV trust data structure 160 with the communication device IDs to yield the trusted NFV time slices 101-105 designated to communication devices 107-109. Other trusted NFV parameters (server ID, memory ID, vNE IDs, APNs) may be yielded in this manner.

In a fourth operation, NFV trust system 170 compares the actual NFV time slices 101-105 to the trusted NFV time slices 101-105 for individual communication devices 107-109—or for sets of communication devices. NFV trust system 170 transfers NFV data 112 indicating the current NFV trust status for communication devices 107-109. In this example, communication device 107 actually used only trusted vNEs 134-136 during trusted time slice 102, so computer system 110 reports NFV trust for device 107. In contrast, communication device 109 actually used trusted vNE 142 during untrusted time slice 104, and actually shared trusted time slice 105 with untrusted vNE 145. As indicated by NFV data 112, communication device 109 does not have NFV trust.

In various examples, various combinations of trusted NFV parameters are checked against the actual NFV parameters used to exchange data for communication devices 107-109. The actual NFV server, memory, and vNEs can be cross-checked against the trusted NFV server, trusted memory, and trusted vNEs. The NFV trust cross-check may be performed on an individual communication device basis in response to data communications with that device. The NFV trust cross-check may be performed on an individual communication device basis for a set of devices responsive to data communications between those devices. Several different NFV trust validation schemes could be implemented based on communication device IDs.

Referring to FIG. 2, data communication network 100 transfers data communications 111 for communication devices 107-109 as follows. Data communication network 100 executes hypervisors 120 to generate an NFV data processing environment having multiple NFV time slices 101-105 (201). Data communication network 100 executes vNEs 131-145 during NFV time slices 101-105 (202) to transfer data communications 111.

Data communication network 100 maintains NFV trust data structure 160 that individually associates communication devices 107-109 with their trusted NFV time slices 101-105 (203). Data communication network 100 maintains NFV history data structure 150 that individually associates communication devices 107-109 with their actual NFV time slices 101-105 based on the execution of vNEs 131-145 during NFV time slices 101-105 (204). Data communication network 100 enters NFV history data structure 150 with individual identifiers for communication devices 107-109 and responsively yields networking data indicating the actual NFV time slices 101-105 used to transfer data communications 111 for individual communication devices 107-109 (205). Data communication network 100 enters NFV trust data structure 160 with the individual IDs for communication devices 107-109 and responsively yields trust data indicating the trusted NFV time slices 101-105 for individual communication devices 107-109 (206). Data communication network 100 transfers alert data for individual communication devices if one of the actual NFV time slices 101-105 does not correspond to one of the trusted NFV time slices 101-105 (207).

Referring to FIG. 3, an exemplary operation of data communication network 100 is described. Communication devices 107-109 exchange user data communications 111 with NFV servers in computer system 110. To exchange user data communications 111, the NFV servers execute vNEs 131-145 during time slices 101-105. The NFV servers then transfer NFV data to an NFV history data system that indicates, for individual communication devices 107-109, the actual server, memory, vNEs, hypervisor, APN, VPN, network address, and user name used for the actual data communications. The NFV history data system maintains a data structure that individually associates communication devices 107-109 with actual NFV parameters based the actual execution of vNEs 131-145 by hypervisors 120 during time slices 101-105. Thus, for a given communication device ID, the NFV history data system associates its actual NFV time slice ID, server ID, memory ID, vNE IDs, hypervisor ID, APN, VPN ID, device network address, and device user name. The NFV history data system transfers individual device IDs and with their actual NFV parameters to an NFV trust controller.

To implement data communications network 100, an NFV trust data system is configured with trusted NFV parameters for individual communication devices 107-109 based on network design and control constraints. The trusted NFV parameters include the trusted server, memory, vNEs, hypervisor, APN, VPN, network address, and user name that should be used for trusted NFV data communications. The NFV trust data system maintains a data structure that individually associates communication devices 107-109 with trusted NFV parameters based the network design. Thus, for a given communication device ID, the NFV trust data system associates its trusted NFV time slice ID, server ID, memory ID, vNE IDs, hypervisor ID, APN, VPN ID, device network address, and device user name. The NFV trust data system transfers individual device IDs and with their trusted NFV parameters to the NFV trust controller.

The NFV trust controller compares the actual NFV parameters to the trusted NFV parameters for individual communication devices 107-109. NFV trust system 170 transfers NFV trust alerts for individual communication devices 107-109 if one of the actual NFV parameters does not correspond to its trusted counterpart NFV parameter.

In various examples, NFV trust verification may be performed for various reasons. For example, all communications with a device may be continually checked. In other examples, only communications among a set of communication devices are checked. In some examples, a successful NFV trust verification may be required before a session request is handled. For example, a voice call between a pair of devices may be subject to a successful NFV trust verification. Likewise, a client-server session between a pair of devices may be subject to a successful NFV trust verification.

Figure 4:
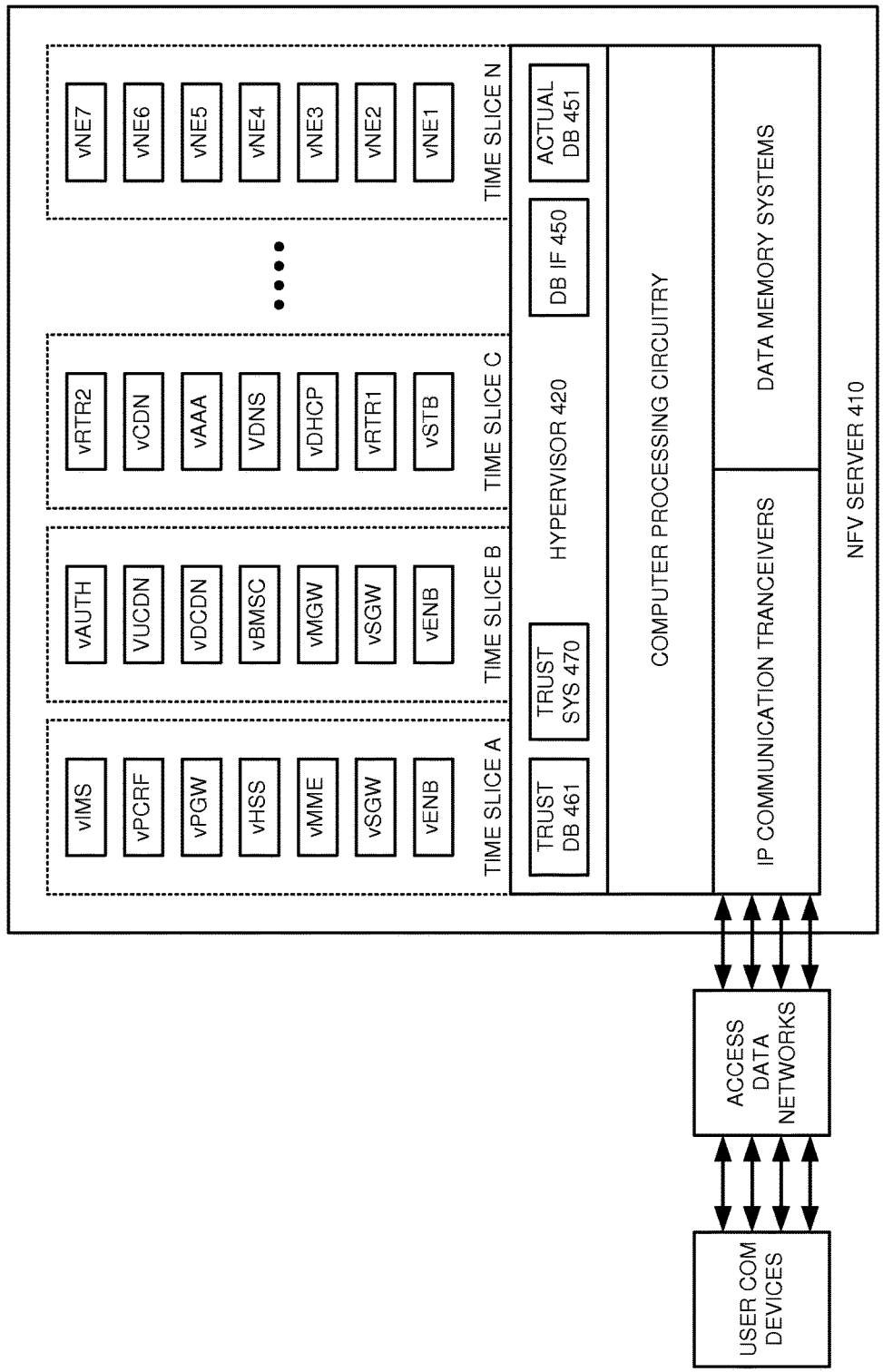
FIGS. 4-5 illustrate a data communication system host various data networks and validate NFV parameters for data communication devices
Figure 5:
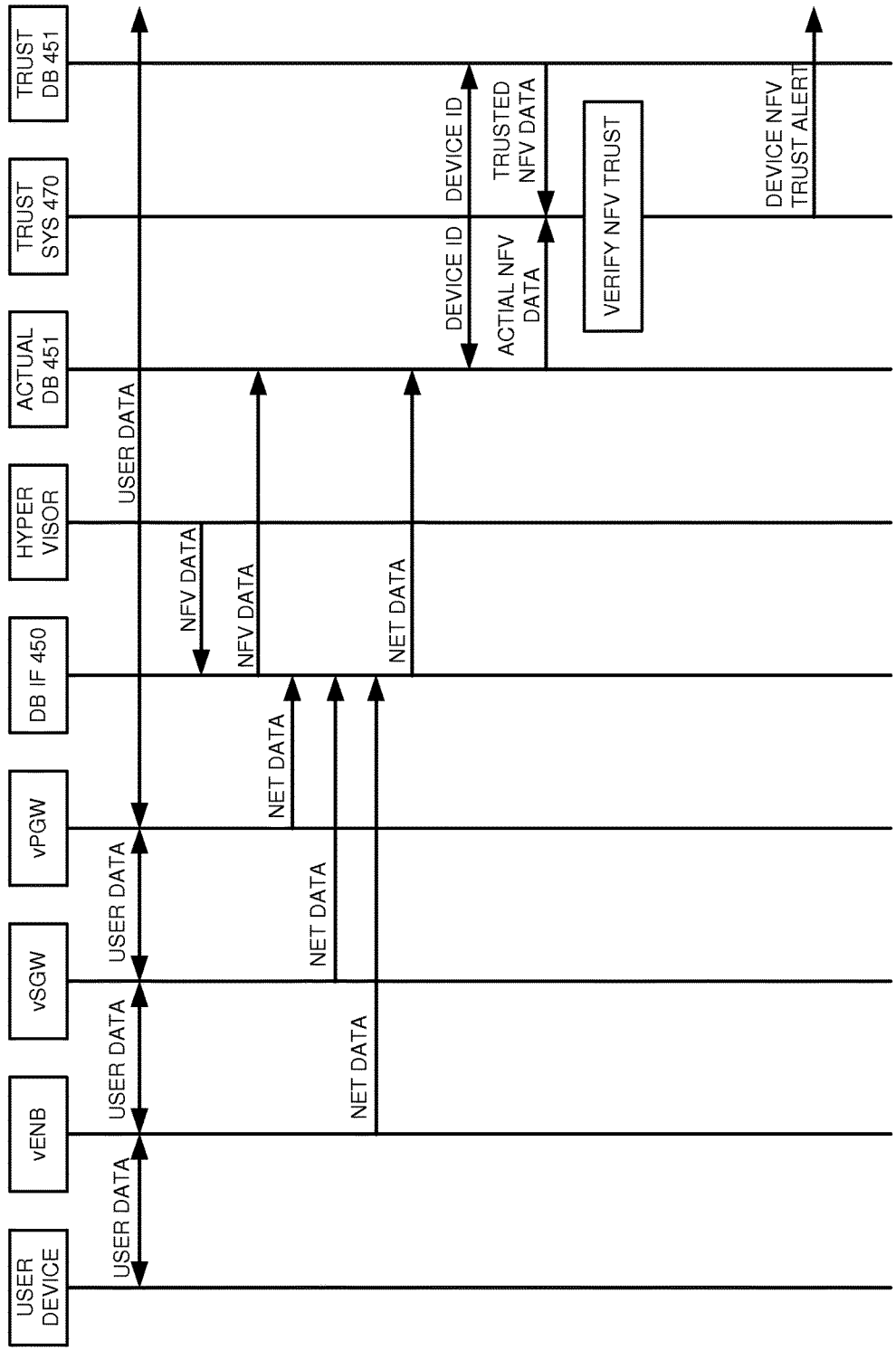

FIGS. 4-5 illustrate data communication system 400 to validate Network Function Virtualization (NFV) parameters for data communication systems and devices. Data communication system 400 is an example of data communication system 100, although system 400 and system 100 may vary in some aspects. Data communication system 400 comprises NFV server 410 that exchanges user data communications with millions of user communication devices over several access data networks. Exemplary user communication devices include phones, computers, servers, intelligent machines, and the like. Exemplary access data networks include wireless networks, optical networks, and metallic networks that transfer Internet Protocol (IP) packets using technologies like Ethernet, Time Division Multiplex (TDM), Data Over Cable System Interface Specification (DOCSIS), Synchronous Optical Network (SONET), Wave Division Multiplex (WDM), Long Term Evolution (LTE), and Wireless Fidelity (WiFi)—including combinations thereof.

NFV server 410 comprises computer processing circuitry, IP communication transceivers, data memory systems, and various software modules and databases. The computer processing circuitry executes hypervisor 420 to control the execution of various virtual network elements during a series of NFV time slices A-N. Hypervisor 420 includes database interface 450, actual database 451, trust database 461, and trust system 470. Hypervisor 420 and the virtual network elements comprise software modules that are stored in the data memory system and that are executed by the computer processing circuitry. The virtual network elements exchange IP packets with the user communication devices over the IP communication transceivers and the access data networks.

The virtual network elements that are executed in time slice A comprise an LTE network: eNodeB controller (vENB), Service Gateway (vSGW), Mobility Management Entity (vMME), Home Subscriber System (vHSS), Packet Data Network Gateway (vPGW), Policy Charging and Rules Function (vPCRF), and Internet Multimedia Subsystem (vIMS). The virtual network elements that are executed in time slice B comprise an enhanced Multimedia Broadcast Multicast Service (eMBMS) network: vENB, vSGW, MBMS Gateway (vMGW), Broadcast Multicast Service Center (vBMSC), Downstream Content Delivery Network (vDCDN), upstream Content Delivery Network (vUCDN), and multimedia Authorization server (vAUTH). The virtual network elements that are executed in time slice C comprise an Internet Service Provider (ISP) network: Set-Top Box controller (vSTB), aggregation Router (vRTR1), Dynamic Host Control Protocol server (vDHCP), Domain Name System server (vDNS), Authentication, Authorization, and Accounting server (vAAA), Content Delivery Network (vCDN), and core Router (vRTR2). The virtual network elements that are executed in time slice N comprise a data communication system that comprises virtual Network Elements (vNEs) 1-7.

Referring to FIG. 5, an exemplary operation of data communication system 400 is described. In this example, a user communication device exchanges user data with an external data system (not shown) over the vENB, vSGW, and vPGW. In response, the hypervisor transfers NFV data to NFV database interface 450. The NFV data indicates the NFV server, CPU, memory, transceiver, time slice, hypervisor, and virtual network elements (vENB, vSGW, vPGW) as associated by actual use and execution. NFV database interface 450 loads actual NFV database 451 with these NFV data associations. The virtual network elements (vENB, vSGW, vPGW) transfer networking data to NFV database interface 450 that indicates the network element IDs, communication device IDs, session IDs, APNs, QCIs, VPNs, network addresses, user names, and times as associated by actual data communication usage. The network addresses comprise IPv4 or IPv6 address strings or prefixes. NFV database interface 450 loads actual NFV database 451 with these networking data associations.

In this example, NFV database interface 450 cross-associates the NFV data and the networking data by virtual network element and time to correlate communication device IDs with NFV time slices and other NFV parameters. NFV database interface 450 cross-associates other networking data, such as APNs and VPNs with the NFV time slices and other NFV parameters. The networking data is referred to as NFV data after its correlation with the NFV parameters.

Trust system 470 is configured with trust data that individually associates communication device IDs with trusted NFV data including: server ID, CPU ID, memory ID, transceiver ID, time slice ID, hypervisor ID, virtual network element IDs, communication device IDs, session IDs, APNs, QCIs, VPNs, network addresses, user names, and usage times as associated by actual execution and usage. The trusted NFV parameters comprise network design and control data. Trust system 470 enters actual database 451 and trust database 461 with communication device IDs and perhaps other data to yield both actual NFV data and trusted NFV data.

Trust system 470 compares the actual NFV data to the trusted NFV data by communication device ID, NFV time slice ID, server ID, CPU ID, memory ID, transceiver ID, hypervisor ID, virtual network element IDs, session IDs, APNs, QCIs, VPNs, network addresses, and user name. If the actual NFV data matches the trusted NFV data for a communication device ID, then the corresponding communication device has NFV trust. If the actual NFV data does not match the trusted NFV data for a communication device ID, then the corresponding communication device does not have NFV trust. A data alert is then generated and transferred.

Figure 6:
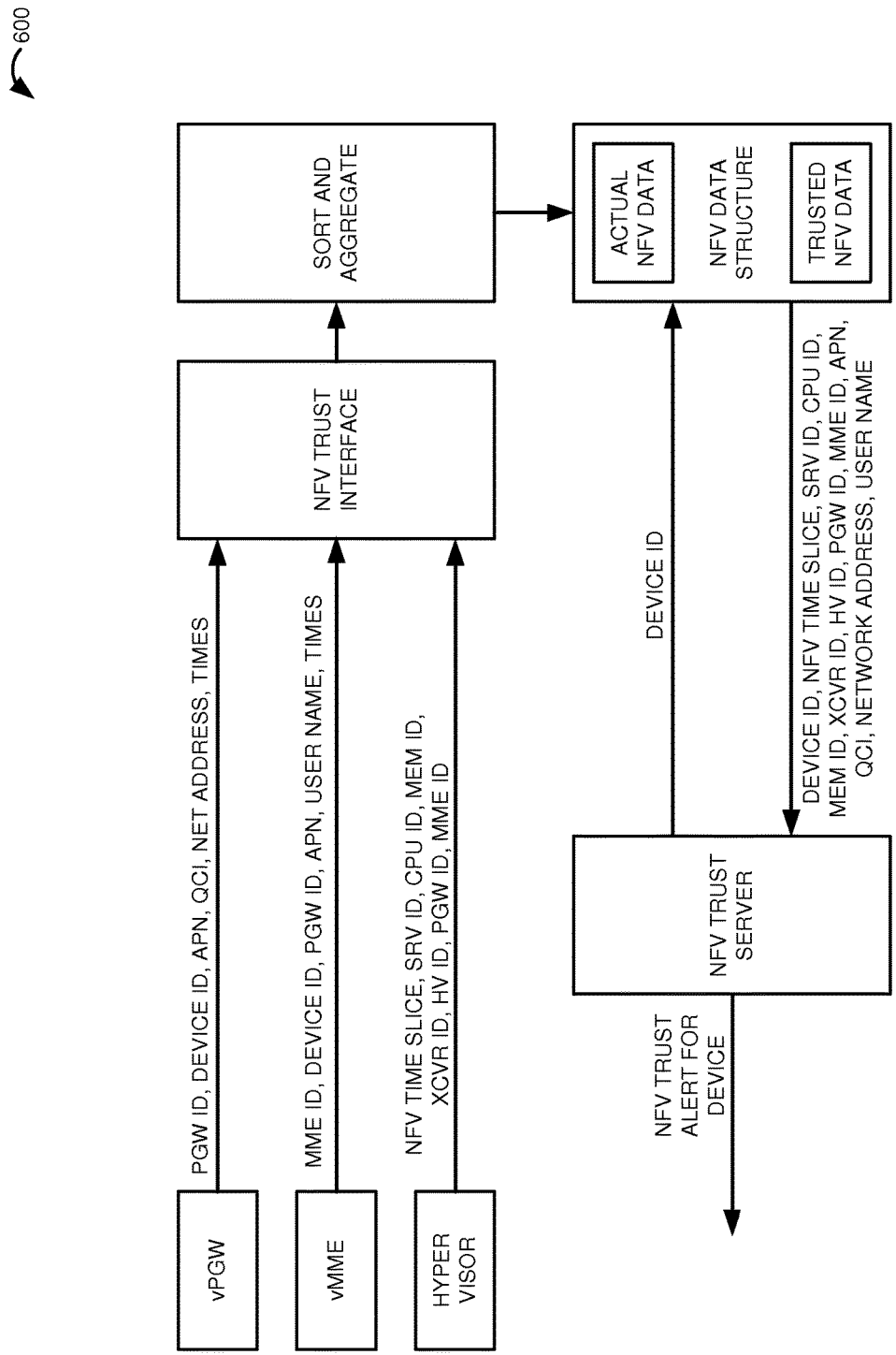
FIG. 6 illustrates a data communication network to validate NFV parameters for data communication devices.

FIG. 6 illustrates data communication network 600 to validate Network Function Virtualization (NFV) parameters for data communication devices. In network 600, a vPGW, vMME, and hypervisor transfer NFV and networking data to an NFV trust interface in response to actual communication transfers and virtual network element execution. The data from the vPGW indicates PGW ID, device ID, APN, QCI, network address, and usage times (or time slice). The data from the vMME indicates MME ID, device ID, PGW ID, APN, user name, usage times (or time slice). The data from the hypervisor indicates the NFV time slice, server ID, CPU ID, memory ID, XCVR ID, hypervisor ID, MME ID, and PGW ID. The NFV trust interface forwards the NFV and networking data for sorting and aggregation by network element ID, communication device ID, time, and other factors. The sorting and aggregation process loads actual NFV data structure. The NFV data structure is configured with trusted NFV data.

An NFV trust server issues communication device IDs to NFV data structure which yields the actual and trusted NFV data for validation. The actual data and the trusted data each include device ID, NFV time slice ID, server ID, CPU ID, memory ID, XCVR ID, hypervisor ID, PGW ID, MME ID, APN, QCI, network address, and user name. The NFV trust server performs a comparison for data correspondence. Note that exact matches may not be required and that various value ranges may be used. Exact matches may be required for some values while overlap or proximity may be allowed in others. Various statistical scoring techniques could be applied to determine NFV trust for a communication device.

If the actual NFV data adequately corresponds with the trusted NFV data for the communication device, then the communication device has NFV trust. If the actual data does not adequately correspond to the trusted data for the communication device, then the communication device does not have NFV trust, and the NFV trust server issues an NFV trust alert for the communication device.

Various systems may subscribe to the NFV trust server for NFV alerts. Various systems may access the NFV trust server on-demand for NFV trust verification. For example, an IP session server may request an NFV trust verification before allowing particular communication devices to exchange IP addresses. In some examples, the hypervisor is the NFV trust interface and has reporting APIs for the virtual network elements. The hypervisor may perform the sort and aggregate process. The hypervisor may host the NFV data structure. The hypervisor may include the NFV trust server.

Figure 7:
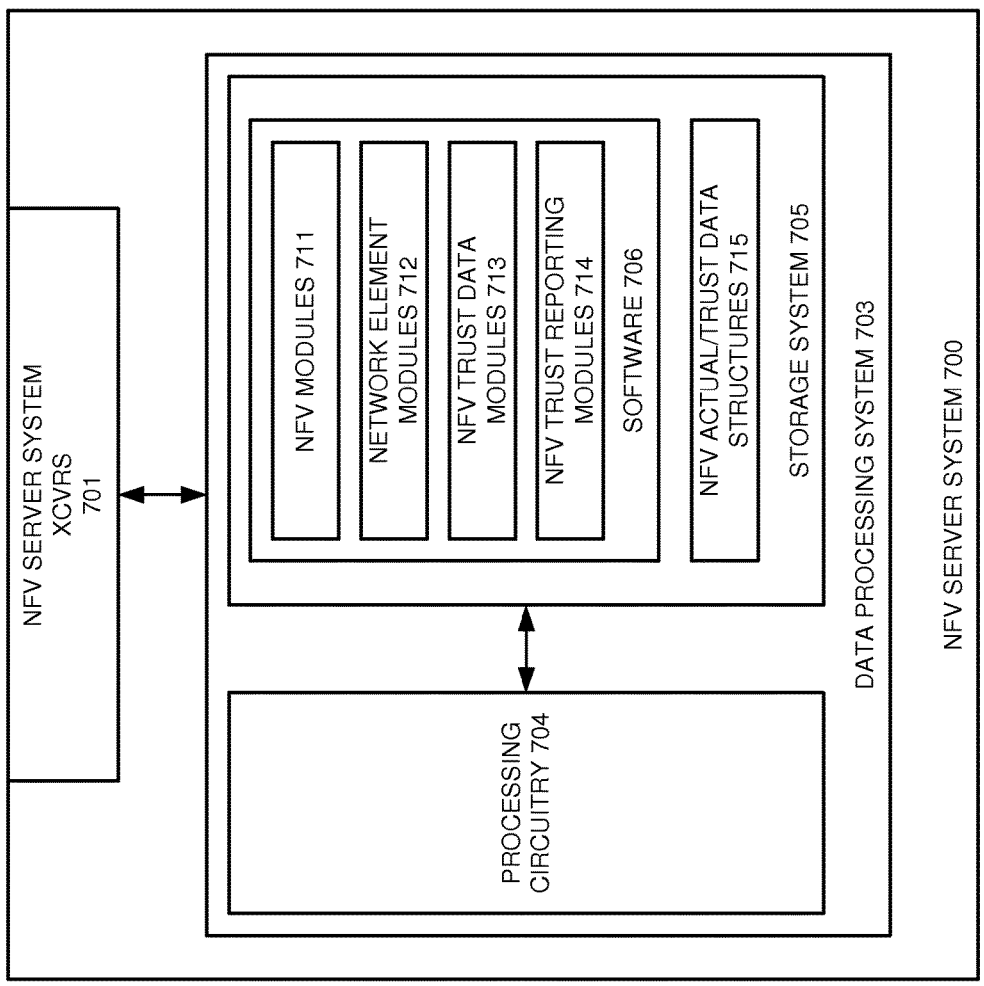
FIG. 7 illustrates an NFV server to validate NFV parameters for data communication devices.

FIG. 7 illustrates Network Function Virtualization (NFV) server system 700 to validate NFV parameters for data communication devices. NFV server system 700 is an example of systems 110 and 410, although these systems may use alternative configurations and operations. NFV server system 700 comprises NFV server system transceivers 701. System transceivers 701 comprise communication components, such as ports, bus interfaces, signal processors, memory, software, and the like. System transceivers 701 exchange user data communications and NFV trust data with various systems and devices.

NFV server system 700 comprises data processing system 703. Data processing system 703 comprises processing circuitry 704 and storage system 705. Storage system 705 stores software 706 and data structure 715. Software 706 includes software modules 711-714. Some conventional aspects of NFV server system 700 are omitted for clarity, such as power supplies, enclosures, and the like. NFV server system 700 may be centralized or distributed and includes various virtualized components.

In data processing system 703, processing circuitry 704 comprises server blades, circuit boards, bus interfaces and connections, integrated circuitry, and associated electronics. Storage system 705 comprises non-transitory, machine-readable, data storage media, such as flash drives, disc drives, memory circuitry, tape drives, servers, and the like. Software 706 comprises machine-readable instructions that control the operation of processing circuitry 704 when executed. Software 706 includes software modules 711-714 and may also include operating systems, applications, data structures, virtual network elements, utilities, data structures, and the like. All or portions of software 706 may be externally stored on one or more storage media, such as circuitry, discs, tape, and the like.

When executed by processing circuitry 704, NFV modules 711 direct circuitry 704 to create the NFV processing environment and provide NFV data reporting as described herein. When executed by processing circuitry 704, network element modules 712 direct circuitry 704 to exchange data communications for communications devices and provide networking data reporting as described herein. When executed by processing circuitry 704, NFV trust data modules 713 direct circuitry 704 to associate the NFV and networking data for individual communication devices and load NFV data structures 715. When executed by processing circuitry 704, NFV trust reporting modules 714 direct circuitry 704 to compare the actual and the trusted NFV/networking data for the proper correspondence and to report the resulting NFV trust data—including NFV trust alerts for individual communication devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Network Function Virtualization (NFV) computer system to verify NFV parameters for a user communication device using a hypervisor that executes on an NFV server of the NFV computer system, the hypervisor including at least a database interface, an actual database, a trust database, and a trust system, the method comprising:
    storing, on the trust database, NFV trust data that individually associates the user communication device with trusted NFV parameters including trusted servers, trusted NFV virtual Network Elements (vNEs), and trusted NFV time slices;
    exchanging, by the NFV computer system, user data for the user communication device with an external data system over one or more actual NFV virtual network elements (vNEs) during a series of actual NFV time slices;
    in response to exchanging the user data for the user communication device with the external data system, generating, by the hypervisor, NFV history data that describes actual NFV parameters including actual servers, actual NFV vNEs, and actual NFV time slices for the user data exchanged for the user communication device;
    loading, by the database interface, the actual database with the NFV history data;
    entering, by the trust system, an ID of the user communication device to the actual database and the trust database to yield the NFV trust data and the NFV history data of the user communication device;
    comparing, by the trust system, the NFV history data to the NFV trust data of the user communication device to verify whether the user communication device has NFV trust;
    generating an NFV trust alarm for the user communication device when the NFV history data does not correspond to the NFV trust data; and
    transferring the NFV trust alarm to a system that subscribes to the NFV computer system for NFV alerts.

2. The method of claim 1 further comprising:
    storing additional NFV trust data for the user communication device that indicates trusted NFV Central Processing Units (CPUs); and
    the NFV computer system generating additional NFV history data that describes actual NFV CPUs for the user data exchange.

3. The method of claim 1 further comprising:
storing additional NFV trust data for the user communication device that indicates trusted NFV memories; and
the NFV computer system generating additional NFV history data that describes actual NFV memories for the user data exchange.

4. The method of claim 1 further comprising:
storing additional NFV trust data for the user communication device that indicates trusted NFV data transceivers; and
the NFV computer system generating additional NFV history data that describes actual NFV data transceivers for the user data exchange.

5. The method of claim 1 further comprising:
storing additional NFV trust data for the user communication device that indicates trusted NFV Virtual Private Networks (VPNs); and
the NFV computer system generating additional NFV history data that describes actual NFV VPNs for the user data exchange.

6. The method of claim 1 further comprising:
storing additional NFV trust data for the user communication device that indicates trusted NFV Access Point Names (APNs); and
the NFV computer system generating additional NFV history data that describes actual NFV APNs for the user data exchange.

7. The method of claim 1 further comprising:
storing additional NFV trust data for the user communication device that indicates trusted NFV Quality-of-Service (QoS); and
the NFV computer system generating additional NFV history data that describes actual NFV QoS for the user data exchange.

* * * * *